Sept. 22, 1936.    E. PRAETORIUS ET AL    2,055,017
LIGHT SENSITIVE CELL
Filed Dec. 28, 1932
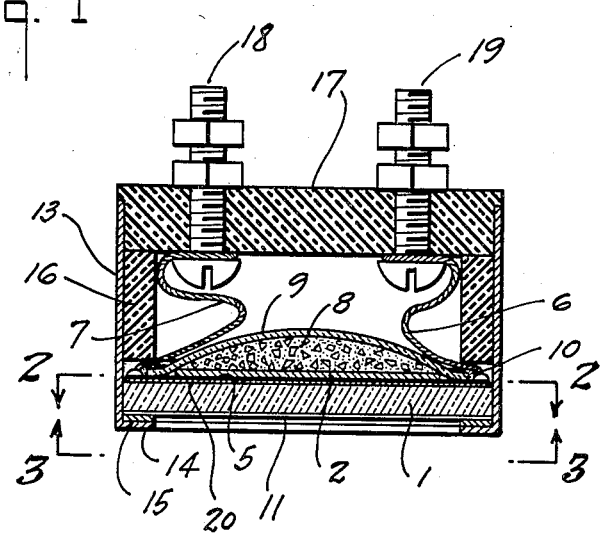
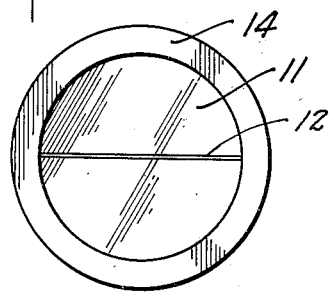
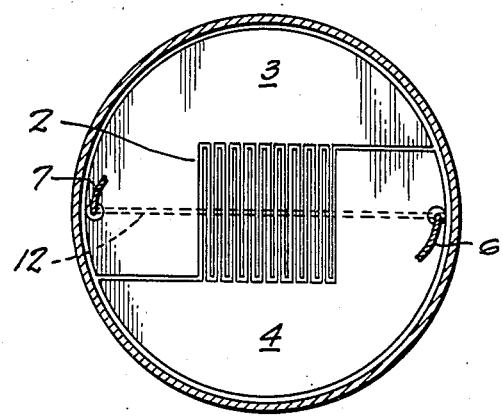
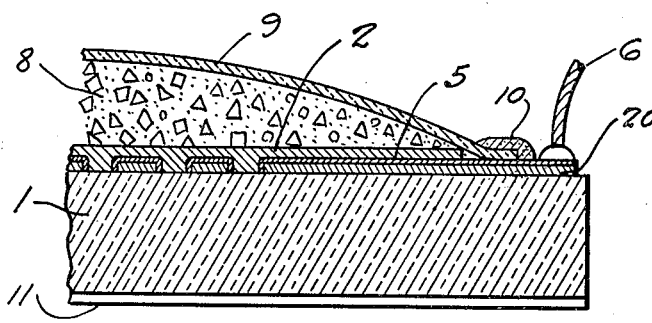
INVENTORS
Edward Praetorius
John E. Stewart
BY John Flam
ATTORNEY Patented Sept. 22, 1936

2,055,017

UNITED STATES PATENT OFFICE 2,055,017

LIGHT SENSITIVE CELL

Edward Praetorius and John E. Stewart, Los Angeles, Calif.

Application December 28, 1932, Serial No. 649,144

5 Claims. (Cl. 201—63)

This invention relates to a light sensitive cell, and especially to a type of cell known as a selenium cell, for converting variations of light intensities into variations in current flow.

Since the theory of operation of such devices is very well known, it is unnecessary to detail it here. Such cells are in common use for example for sound reproduction from motion picture films, and for burglar alarm systems, or the like.

In cells of the prior art, it has been common to provide a grid of suitably sensitized selenium between two metal contacts, formed for example of platinum attached to a glass backing. In such cells the grid of selenium acts as a dividing strip between the contacts, whereby a considerable area of contact from the selenium to each contact is secured.

It is one of the objects of this invention to provide an improved form of cell of this character.

It is another object of this invention to provide a cell construction that is rugged, and in which the electrical connection between the selenium and the cooperating contacting metal, is rendered more reliable and permanent.

In many instances, such grids of selenium are interposed in the path of light rays passing through a "sound track" on a film. In order that proper and correct reproduction be secured, it is essential (as is well understood) that only a very narrow portion of the sound track be active at a time. This has necessitated the use of very narrow slits to pass the light to the cell, as well as the use of an optical system for directing the light so transmitted, onto the active material.

Such narrow slits have usually been provided in plates of opaque material. Since extremely narrow slits are needed for correct sound definition (of the order of a small fraction of one one-thousandths of an inch, when used with films of a size suitable for amateur use), it is apparent that such slits can be easily clogged up by fine particles of dust settling upon the inner surfaces of the slit, which are very deep as compared with the width of the slit. Such dust is apt to be derived from the film surface, which runs close to the slit. To overcome this, it has been proposed to fill the slit with some transparent material, such as glass or quartz. However, such schemes have disadvantages, such as optical aberrations introduced into the system.

It is another object of the invention to provide a selenium cell in which these disadvantages are overcome, and especially by providing a slit construction as a part of the cell structure.

This invention possesses many other advantages, and has other objects which may be made more easily apparent from a consideration of one embodiment of the invention. For this purpose there is shown a form in the drawing accompanying and forming part of the present specification. This form shall now be described in detail, which illustrates the general principles of the invention; but it is to be understood that this detailed description is not to be taken in a limiting sense, since the scope of the invention is best defined by the appended claims.

Referring to the drawing:

Figure 1 is an enlarged section of a complete cell embodying the invention;

Fig. 2 is an enlarged section taken along plane 2—2 of Fig. 1;

Fig. 3 is a front view of the cell, taken along plane 3—3 of Fig. 1, the scale being somewhat smaller than that of Fig. 1, but nevertheless considerably enlarged; and Fig. 4 is a very greatly enlarged sectional view of a portion of the cell.

The photosensitive cell has as a main support a translucent member 1, which may be in the form of a thin glass disc. For sound reproduction purposes, the member 1, can be about three-fourths of an inch in diameter and about .050 of an inch thick. However, these dimensions may be varied.

On the back side of the translucent member or support 1, selenium 2 or other suitable prepared light sensitive material is supported. In this way, light passing through the translucent member 1 will affect the selenium 2. In order to secure a large response, the selenium 2 is deposited and supported on the glass plate 1 in a manner now to be described.

First of all, in order to provide contact members for the selenium material 2, one side of disc 1 is covered with a thin layer of metal which has a coefficient of expansion substantially the same as the support 1. This metal may be a thin layer 20 of platinum which has been suitably fused to the glass 1. This fusion to the glass can be accomplished by any well known process, and the metal layer can be very thin; preferably of the order of .00001 of an inch or less. Then by the aid of an engraving machine or the like, the platinum layer 20 is divided into two contact members, having the form indicated by reference characters 3 and 4 in Fig. 2. The thickness of these contact members is very greatly exaggerated in Figs. 1 and 4. By the aid of the engraving tool, the platinum layer is divided by a grid-like strip, where the metal has been removed. At this stage of the process, the glass 1 is visible through the convolutions of the grid. This grid occupies an area at the center of the disc of about a quarter of an inch square, and the width of the strip can be of the order of one one-thousandth of an inch. The lines forming the grid can be spaced so close together as to form one hundred lines in a fourth of an inch. This spacing, as well as the width of the cut away strip, is greatly exaggerated for clearness in Fig. 2.

It is apparent that suitably prepared selenium could then be deposited in the convolutions of the grid, forming a long convoluted strip of active material between the platinum contact members. These contact members would then be in electrical contact with opposite sides of the strip of selenium.

However, it has been found that a much better contact can be secured by interposing between the platinum members and the selenium, a layer of metal that is capable of adhering strongly to the selenium as well as to the platinum. One such metal is gold. Accordingly, a very thin layer of gold 5 can be deposited over all of the exposed sides of contact members 3 and 4. This can be done by an electroplating process, by the aid of which an extremely tenuous film of gold can be deposited. For this purpose, leads 6 and 7 are first securely soldered respectively to the platinum members 4 and 3. These leads can also be used as terminals for the completed cell. For the purpose of electroplating the gold, these terminals are temporarily connected together, and the two leads with the two contact members 3 and 4 can form the cathode of an electroplating circuit.

As shown most clearly in Fig. 4, the electrolytically deposited gold layer 5 covers all of the exposed surfaces of the platinum. Its thickness is very greatly exaggerated in Fig. 4. Next the selenium material 2, suitably sensitized, can be laid over the gold layer 5 and in the grid spaces formed between the interlacing portions of the platinum members 3 and 4.

Furthermore, we prefer to provide some granular hygroscopic material 8 immediately back of the sensitive layer 2. Such hygroscopic material for example can be calcium chloride or phosphorus pentoxide. This can be held in place as by the aid of a celluloid cap 9 attached to the back of the disc 1 as by the aid of a wax seal 10. In this way, deterioration of the selenium layer 2 by climatic or humidity conditions is effectively prevented.

As thus far described, it is apparent that the contact members 3 and 4 with the overlaid tenuous film of gold are in intimate electrical contact with opposite sides of a selenium grid formed in the grooves between the contact members. For sound reproduction it has been considered essential when cells of this character are used, to provide an optical system, whereby an extremely narrow beam of light passing through the sound track will affect the selenium cell at any instant. In commercial sized films, that is 35 mm. films, the beam of light should not be greater than one one-thousandth of an inch wide; and in work utilizing the smaller sized films, that is 16 mm. films, the beam of light should be not more than one-quarter as wide; that is of the order of one-quarter of one one-thousandth of an inch.

This effect has been accomplished in the past by interposing a very narrow slit between the film and the cell. This slit has been formed of metal plates having a thickness much greater than the width of the slit. It has been found difficult to keep such a slit clean from dust, and for this reason it has been common to fill the slit with some transparent material.

By the aid of this invention, such a structure is obviated, and a compact slit forming device is provided in connection with support 1. For this purpose, a slit is formed by the aid of very thin opaque members, which provide no foothold for the reception or retention of dust particles. Thus when the film is passed adjacent the front of the glass disc 1, any dust that may tend to settle on the slit will drop off, as the edges of the slit are too narrow for holding them in place.

To accomplish this result, there is deposited on the front side of the glass disc 1, an extremely thin, opaque layer 11 of platinum or its equivalent. This layer of platinum can have a thickness of the order of .00001 of an inch or less, and is fused to the glass. Then a very thin slit 12 is cut through this platinum layer, and preferably in a direction transverse to the convolutions of the selenium grid. This slit 2 can be of any desired degree of fineness, such as one one-thousandth of an inch for commercial films, or one-quarter that width for the amateur sizes.

It is apparent that with such an arrangement, the cell can be placed quite close to a sound track, and there is no need of the interposition of any optical system. The light passing through slit 12 and the disc 1, may spread to some extent in a direction transverse to the slit, as by diffraction; but this merely results in rendering a larger portion of the exposed selenium area effective, without reducing the fineness of the definition.

The translucent support 1 with its adherent members can be appropriately supported to form a cell assembly, in any desired way. One manner of supporting it is illustrated in Fig. 1.

Thus a tubular casing 13 is shown, having a flange 14. A fibre or yielding washer 15 is placed inside of the tubular casing 13 and on top of this washer is placed the cell structure including the support 1. Then a tube 16 of rubber or other yielding material is slipped inside of the casing 13 and is held in place by friction. It engages the cell near the outer edge of the cell and serves as a shock absorbing medium to guard against rough usage. An insulation cover 17 is then pressed into the casing 13 and is frictionally held therein; by the inner wall of the casing. This insulation cover can be of bakelite or equivalent material. It can carry the binding posts 18 and 19, to which leads 6 and 7 may be soldered. These posts extend externally of the casing for appropriate connection in the sound circuit. When pressed into place as shown in Fig. 1, the cover 17 slightly compresses the resilient tube 16 against the disc 1, thereby holding this disc and its associated parts in tight relationship to casing 13.

It is apparent that the present structure provides an optical slit supported on one side or surface of a glass disk, and a selenium cell supported on the other or opposite side or surface of the same glass disk. Thus there is produced a one piece combination in which the optical slit is not subjected to any electrical stresses.

This is an important consideration. When it is attempted to use a single selenium line cell to obviate an optical system, the line of selenium must be very fine, of the order of .001 inch in width. The slit in which this selenium is placed is defined by adherent metal layers bridged by the selenium and forming terminal plates respectively for the opposite sides of the line. The necessary electrical potential or stress is thus concentrated on a very narrow area and width of selenium. Accordingly, there is a likelihood of electrical breakdown of the cell across the slit, as well as a likelihood of the production of microscopic noises.

In the present construction described herein, these disadvantages are entirely overcome. The grid 2 presents ample area to terminal plates 3 and 4 to withstand an electrical breakdown. The optical slit 12 can be made as narrow as needed, as no selenium is associated therewith, nor is there any electrical potential across its sides. The slit 12 performs the sole function of an optical system or mask, while the selenium on the other side of the glass disk 1 performs the sole function of a variable resistance photo-cell.

In the claims, the term "selenium material" is intended to include not only selenium, but compounds thereof that exhibit light sensitive properties similar to selenium.

Also, the term "optical slit" in the claims is intended to refer to a slit used in sound reproduction of apparatus of such narrow proportions as to obviate the necessity of a lens system to confine the illumination of the light sensitive cell to the requisite narrow area.

We claim:

1. In a cell of the character described, a transparent insulation support, a two-part metal layer, fused to the support and spaced apart to define a narrow strip between the parts, selenium material in the strip and in contact with both parts, and a two part metal layer fused to the other side of the support and defining a narrow slit.

2. In a cell of the character described, a transparent insulation support, a two-part platinum layer, fused to the support and spaced apart to define a narrow strip between the parts, a thin layer of gold disposed over the two-part metal layer, and selenium in the strip and in contact with the thin layer.

3. In a cell of the character described, a transparent insulation support, means forming a pair of spaced platinum contact members fused to the support, a thin layer of gold disposed over both members, and selenium bridging the members.

4. In a cell of the character described, a glass support, a pair of spaced platinum contact members fused to the support, a thin layer of gold disposed over the members, and selenium bridging the members.

5. In a cell of the character described, a glass support, a pair of spaced platinum contact members fused to the support, a thin layer of gold electrolytically deposited over the members, and selenium in contact with said thin layers and bridging the members.

EDWARD PRAETORIUS.
JOHN E. STEWART.